Patented Feb. 19, 1929.

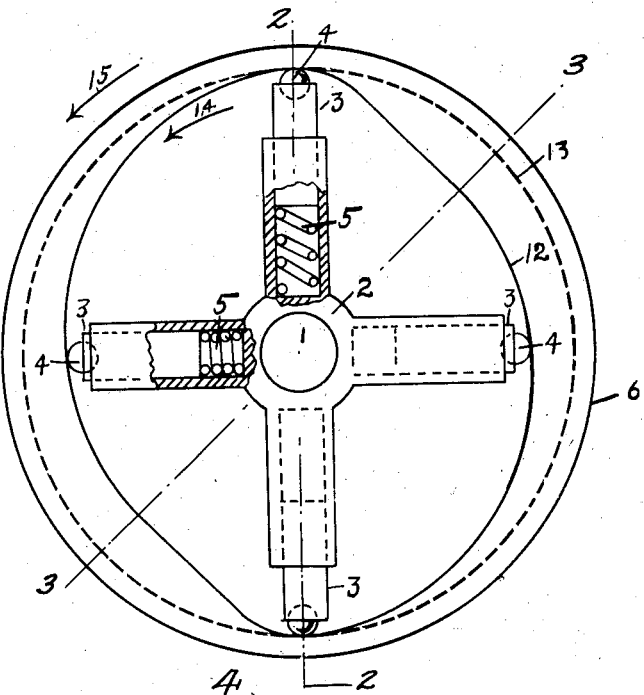
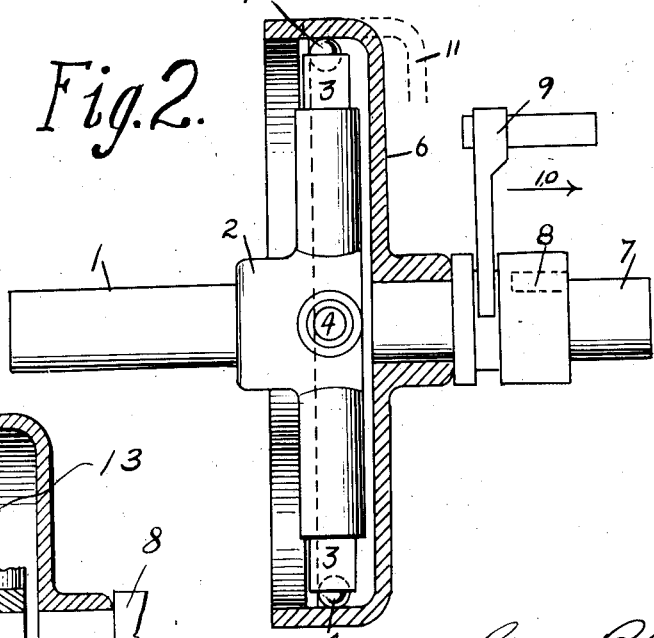
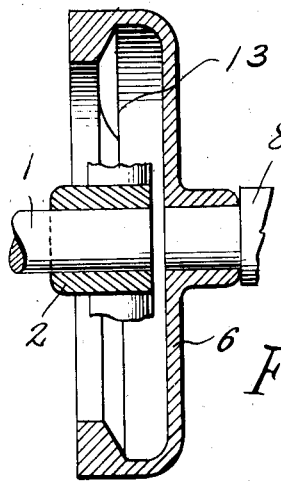

1,703,061

UNITED STATES PATENT OFFICE.

GEORGE B. COLEMAN, OF DAYTON, OHIO, ASSIGNOR TO COLEMAN AUTOMATIC TRANSMISSION COMPANY, OF SAN FRANCISCO, CALIFORNIA, A CORPORATION OF CALIFORNIA.

TRANSMISSION.

Application filed November 10, 1924. Serial No. 749,064.

This invention relates to a transmission, and has particular reference to a transmission capable of use in auotmobiles, locomotives, or vehicles; and as a transmisison capable of use as a coupling or clutch.

An object of this invention is to provide a transmission capable of infinite speed ratio, and one where such speed ratio is automatically adjusted to suit the operating requirements.

A further object of this invention is to provide such a transmission and to make unnecessary the use of toothed gearing, or the like, friction clutches or friction discs, as a driving medium between the prime mover and the driven member.

A further object of this invention is to provide such a transmission, that will operate as a flexible coupling for electric motors or the like, whereby the motor will be allowed to approach its normal operating speed without load, the load then being either manually or automatically thrown in with great speed ratio, and this ratio then being gradually decreased until the load reaches the motor speed, the transmission then being in effect a direct connection with no relative movement of parts.

A further object of this invention is to provide such a transmisison embodying a neutral position, or a position where the prime mover will be free to rotate and transmit no power to the driven member, together with means for changing from neutral position to operating position at any speed ratio without the aid of friction clutches, or the like.

One form of my invention is illustrated in the accompanying drawing, in which Figure 1 is an end view, mainly diagrammatic, of a transmission embodying my invention.

Figures 2 and 3 are respectively sectional views on the planes indicated by the lines 2—2 and 3—3 of Figure 1.

Similar numerals refer to similar parts throughout the different drawings.

The shaft 1 is adapted to be driven by any convenient source of motive power. To shaft 1 and adapted to be rotated thereby, is secured the spider structure 2, which supports and constitutes slidable bearings for the bearing supports 3. To the bearing supports 3 are mounted the bearings 4, which are shown as steel balls but could be replaced by roller wheels, etc. if desired. The springs 5 hold the bearing supports in outward position. The structure 2 is adapted to rotate within the shell 6 which shell forms a race or path for the balls 4. To shell 6 is secured shaft 7, shell 6 being adapted for endwise motion along shaft 7 but held against rotary motion on shaft 7 by the key 8. By moving the shifter 9 in the direction of arrow 10 the shell will be likewise moved to the position shown by dotted lines 11. In the position shown in the drawings the ball race is of irregular form or shape 12. When the shell is moved to position 11 the ball race there is of true circular form 13.

If shaft 1 be rotated in the direction of arrow 14, and a load be applied to shaft 7, the irregular form of the ball race 12 will cause the bearing supports 3 and bearings 4 to be successively moved towards and away from the shaft axis during rotation. When speed is attained centrifugal force will greatly resist the inward movement of these bodies and the ball race 12 will be in effect a cam and shell 6 will be made to rotate in the direction of arrow 15. When the load speed reaches that of the prime mover, centrifugal force will hold the movable members 3 and 4, in outward position, and there will be no relative movement between the balls and the shell 6. If additional load is applied to shaft 7, there will be relative movement between the balls and the shell 6, and shell 6 will continue to rotate in the direction of arrow 15 only slower. The speed ratio between shafts 1 and 7 is infinite and dependent upon the amount of power supplied to shaft 1 and upon the load applied to shaft 7.

If shifter 9 be now moved in the direction of arrow 10 the shell 6 will be moved to the position shown by dotted lines 11, and the balls will be gradually shifted from the irregular ball race form 12 to the true circular ball race form 13. There will be no radial movement of the balls in this position, no cam action and the power of shaft 1 will not be transmitted to shaft 7. The transmission is now in neutral position and may be shifted back and forth from or to the neutral position at any time and at any ratio.

It is obvious that any number of cams might be employed and that any number of bearing contacts might be employed within the scope of this invention. Also the whole structure might be mounted within a casing, emersed in oil, etc. It should be noted that the greater the ratio or speed difference between shafts 1 and 7, the greater the number of turning impulses will be imparted to shaft 7. This invention provides a simple gearless, practically noiseless, inexpensive, durable, and efficient transmission, and it is obvious that a number of changes or modifications as to the details of my invention might be made without affecting the spirit of the invention and within the scope of the claim hereto attached.

I claim:

A transmission comprising driving and driven members of which one comprises a spider and the other a shell in surrounding relation to the spider, the spider having radially disposed tubular arms, supports telescoping said arms, compression springs enclosed in the arms and bearing upon the supports, and spherical bearing elements carried at the outer ends of said supports, the shell having a cylindrical inner peripheral surface and an irregular inner peripheral surface merging into the cylindrical surface, the spider and the shell being relatively movable and the spherical bearing elements engaging both the cylindrical and irregular surface of the shell depending on the relative positions of the spider and the shell.

GEORGE B. COLEMAN.